United States Patent
Nordberg et al.

(10) Patent No.: US 10,628,505 B2
(45) Date of Patent: Apr. 21, 2020

(54) USING GESTURE SELECTION TO OBTAIN CONTEXTUALLY RELEVANT INFORMATION

(71) Applicant: Microsoft Technology Licensing, LLC, Redmond, WA (US)

(72) Inventors: Sean Gary Nordberg, Bellevue, WA (US); Danielle Lauren Ellbogen, Seattle, WA (US); Michael John Patten, Sammamish, WA (US); Clarice Jiarui Chan, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 256 days.

(21) Appl. No.: 15/151,581

(22) Filed: May 11, 2016

(65) Prior Publication Data

US 2017/0286552 A1 Oct. 5, 2017

Related U.S. Application Data

(60) Provisional application No. 62/315,155, filed on Mar. 30, 2016.

(51) Int. Cl.
| | | |
|---|---|---|
| G06F 16/16 | (2019.01) | |
| G06F 16/9535 | (2019.01) | |
| G06F 16/248 | (2019.01) | |
| G06F 16/242 | (2019.01) | |
| G06F 3/0481 | (2013.01) | |
| G06F 3/0484 | (2013.01) | |
| G06F 3/0488 | (2013.01) | |
| G06F 17/27 | (2006.01) | |
| G06K 9/20 | (2006.01) | |

(52) U.S. Cl.
CPC ...... *G06F 16/9535* (2019.01); *G06F 3/04815* (2013.01); *G06F 3/04842* (2013.01); *G06F 3/04883* (2013.01); *G06F 16/248* (2019.01); *G06F 16/2428* (2019.01); *G06F 17/2705* (2013.01); *G06K 9/2081* (2013.01)

(58) Field of Classification Search
CPC ............. G06F 3/04815; G06F 3/04883; G06F 3/04842; G06F 17/30867; G06F 17/30554; G06F 17/30398; G06F 17/2705; G06F 16/9535; G06F 16/2428; G06F 16/248
USPC ................................. 707/706; 715/863, 765
See application file for complete search history.

(56) References Cited

U.S. PATENT DOCUMENTS 8,650,507 B2   2/2014 Westerman et al.
8,854,433 B1 * 10/2014 Rafii ....................... G06F 3/017
                                                          348/42

(Continued)

OTHER PUBLICATIONS

"International Search Report and Written Opinion Issued in PCT Application No. PCT/US2017/024220", dated Jun. 12, 2017, 10 Pages.

(Continued)

*Primary Examiner* — Jean M Corrielus
(74) *Attorney, Agent, or Firm* — Rainier Patents, P.S.

(57) ABSTRACT

Described herein are various technologies pertaining to using a gesture to obtain contextually relevant information. Content within an area selected by a gesture is extracted. The extracted content and additional contextual information are packaged, optionally disambiguated, and provided to a search engine. Result(s) provided by the search engine are provided to a user to enrich the user experience.

11 Claims, 9 Drawing Sheets

(56) References Cited

U.S. PATENT DOCUMENTS

| | | | |
|---|---|---|---|
| 8,977,961 B2 | 3/2015 | Vaidya et al. | |
| 9,030,498 B2 | 5/2015 | Galor et al. | |
| 9,201,520 B2 | 12/2015 | Benko et al. | |
| 9,310,891 B2* | 4/2016 | Rafii | G06F 3/017 |
| 9,448,636 B2* | 9/2016 | Balzacki | G06F 3/017 |
| 9,916,396 B2* | 3/2018 | Hong | G06F 16/9032 |
| 2002/0041327 A1* | 4/2002 | Hildreth | G06F 3/011 |
| | | | 348/42 |
| 2009/0058820 A1* | 3/2009 | Hinckley | G06F 3/017 |
| | | | 345/173 |
| 2009/0113349 A1 | 4/2009 | Zohar et al. | |
| 2011/0043652 A1* | 2/2011 | King | G06F 17/2211 |
| | | | 348/222.1 |
| 2011/0115702 A1 | 5/2011 | Seaberg | |
| 2011/0173574 A1* | 7/2011 | Clavin | G06F 3/017 |
| | | | 715/863 |
| 2012/0197857 A1 | 8/2012 | Huang et al. | |
| 2012/0294520 A1 | 11/2012 | Mei et al. | |
| 2013/0226935 A1 | 8/2013 | Bai et al. | |
| 2013/0278499 A1* | 10/2013 | Anderson | G06F 3/01 |
| | | | 345/156 |
| 2013/0278501 A1* | 10/2013 | Bulzacki | G06F 3/017 |
| | | | 345/157 |
| 2013/0321403 A1 | 12/2013 | Piemonte et al. | |
| 2014/0003714 A1* | 1/2014 | Mei | G06K 9/00335 |
| | | | 382/164 |
| 2014/0075393 A1 | 3/2014 | Mei et al. | |
| 2014/0101606 A1* | 4/2014 | Albrecht | G06F 3/0481 |
| | | | 715/803 |
| 2014/0172892 A1* | 6/2014 | Schechter | G06F 16/9535 |
| | | | 707/758 |
| 2014/0267130 A1 | 9/2014 | Hwang et al. | |
| 2014/0282275 A1* | 9/2014 | Everitt | G06F 3/017 |
| | | | 715/863 |
| 2015/0180742 A1* | 6/2015 | Zadig | H04L 12/66 |
| | | | 709/224 |
| 2016/0124513 A1* | 5/2016 | Dal Zot | G06F 3/011 |
| | | | 715/863 |
| 2017/0034023 A1* | 2/2017 | Nickolov | H04L 43/0817 |

OTHER PUBLICATIONS

"HoloLens Interaction Model", Published on: Jan. 21, 2016 Available at: https://blogs.windows.com/buildingapps/2016/01/21/hololens-interaction-model/, 4 pages.

"Office Action Issued in European Patent Application No. 17715378.0", dated Jul. 15, 2019, 5 Pages.

* cited by examiner

USING GESTURE SELECTION TO OBTAIN CONTEXTUALLY RELEVANT INFORMATION

CROSS REFERENCE TO RELATED APPLICATION

This application claims the benefit of U.S. Provisional Application No. 62/315,155, filed Mar. 30, 2016, entitled "Using Gesture Selection to Obtain Contextually Relevant Information", which application is incorporated herein in its entirety.

BACKGROUND

Conventional systems generally require a user to explicitly identify text regarding which the user desires information. For example, while reading an article regarding astronomy, the user identifies text (e.g., "Pluto"). The user then either copies the identified text into a search engine accessible by a web browser and/or otherwise explicitly invokes a search feature regarding the identified text ("Pluto"). Such conventional systems are cumbersome and not intuitive to non-technical and/or novice users. Conventional system thus can lead to user frustration.

SUMMARY

Described herein is a system that is configured to use a gesture to obtain contextually relevant information. The system receives a gesture (e.g., circling text on a touchscreen and/or selecting a particular object displayed in a three-dimensional visualization) from a user selecting an object, and, in response, obtains and presents contextually relevant information with respect to the object to the user.

The system includes an extraction component which is configured to receive a gesture from various touch (e.g., touch screen(s)) and/or motion-sensitive systems. Based on the received gesture, the extraction component extracts an object (e.g., literal text, image, video and/or visual representation) within an area selected (e.g., identified or defined) by the received gesture. The extraction component then provides the extracted object to an identification component.

The identification component is configured to identify additional information, if any, to package with the extracted object to assist a disambiguation component and/or a search engine to obtain contextually relevant information. The additional information can include, for example, information about the viewing experience and/or the user. With respect to the viewing experience, the identification component can provide information physically surrounding the object as presented (e.g., displayed), audio file(s), page data, metadata, page link(s) and the like. Optionally, the additional information packaged with the extract object can be based on user-provided preferences (e.g., a user can opt-in to provide information regarding the user's physical location, the user's browsing history, web page(s) recently viewed and other non-personally identifiable information). The identification component packages the extracted object and additional information, if any. In one exemplary embodiment, the identification component provides the package to the disambiguation component. In another exemplary embodiment, the identification component provides the package to the search engine.

The disambiguation component is configured to parse the packaged information to identify one or more dominant entities. In doing so, the disambiguation component is configured to filter out contextually insignificant information such as grammatical articles of speech. The disambiguation component can thus disambiguate content of the packaged information to generate a search query to be provided to the search engine. The system can further includes a presentation component configured to present search result(s) received from the search engine to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
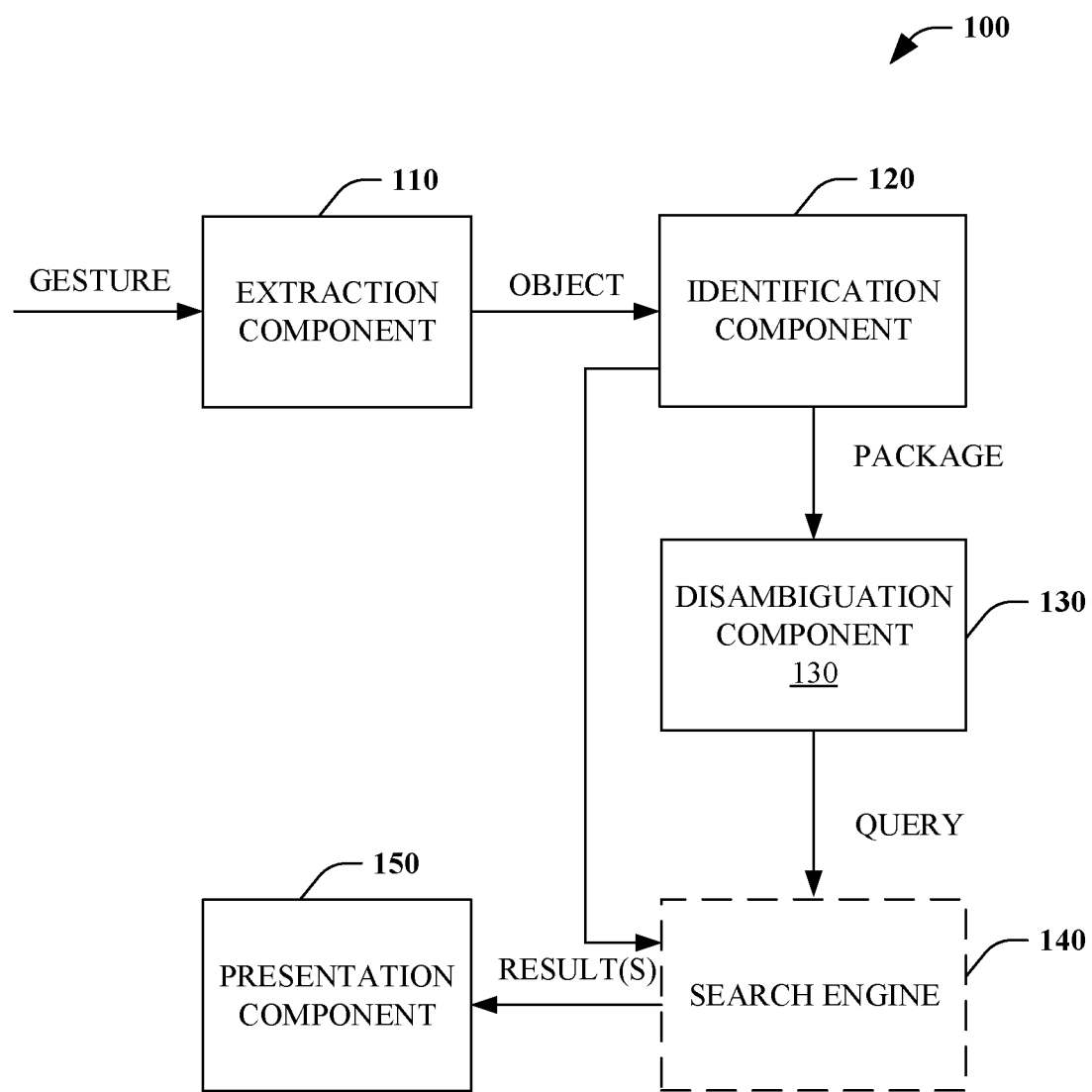
FIG. 1 is a functional block diagram that illustrates a system for using a gesture to obtain contextually relevant information.

Various technologies pertaining to using a gesture to obtain contextually relevant information are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding using a gesture to obtain contextually relevant information. What follows are one or more exemplary systems and methods.

Aspects of the subject disclosure pertain to the technical problem of obtaining contextually relevant information for a user experience. The technical features associated with addressing this problem involve extracting an object (e.g., content) within an area selected by a user gesture, generating a search query based on the extracted object, obtaining result(s) from a search engine based on the search query, and, presenting result(s) to a user. Accordingly, aspects of these technical features exhibit technical effects of obtaining contextually relevant information based on a user gesture to increase user satisfaction thus enriching the user experience.

Described herein are various technologies pertaining to using a gesture (e.g., natural gesture) to obtain contextually relevant information. An object (e.g., content) within an area selected by a gesture is extracted. The extracted object and additional contextual information are packaged, optionally disambiguated, and provided to a search engine. Result(s) provided by the search engine are provided to a user to enrich the user experience.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

"Object" is intended to refer to a visual representation and can include, but is not limited to, text, image(s), 3D visual representation(s) presented by a virtual reality visualization/manipulation system and/or portion(s) thereof. The subject disclosure will be discussed with reference to two scenarios: (1) a touchscreen and (2) a virtual reality visualization/manipulation system. However, those skilled in the art will recognize that the subject disclosure is not limited to these two scenarios and that the subject disclosure can be utilized by any suitable technology for utilizing a gesture to obtain contextually relevant information regarding an object.

Referring to FIG. 1, a system for using a gesture to obtain contextually relevant information 100 is illustrated. The system 100 is configured to receive a gesture from a user selecting an object and, in response, obtain and present contextually relevant information with respect to the object to the user. With a single natural gesture, for example, circling text and/or an image on a touchscreen, a wealth of contextual relevant information regarding the circled text and/or image can be presented to the user.

Conventional systems generally require a user to explicitly identify text of which the user desired information. For example, while reading an article regarding astronomy, the user would identify text (e.g., "Pluto") and either copy the identified text into a search engine accessible by a web browser and/or otherwise explicitly invokes a search feature regarding the identified text ("Pluto"). Such conventional systems are cumbersome and not intuitive to non-technical and/or novice users. In contrast, the system 100 enables a user to implicitly obtain contextually relevant information using a natural gesture such as circling an area on a touch sensitive display and/or selecting a particular object displayed in a three-dimensional visualization via a virtual reality visualization/manipulation system.

The system includes an extraction component 110 which is configured to receive a gesture, for example, from various touch (e.g., touch screen(s)) and/or motion-sensitive systems (e.g., virtual reality visualization/manipulation systems). In one exemplary embodiment, the extraction component 110 can receive a gesture from a gesture-sensitive display which can be an integrated system having a display and sensors and/or from a disparate display and sensors (not shown). In one exemplary embodiment, the extraction component 110 can receive a gesture via a virtual reality visualization/manipulation system (not shown). The virtual reality visualization/manipulation system can include accelerometers/gyroscopes, 3D displays, head, eye, gaze tracking and/or immersive augmented reality systems. The gesture can select a portion of content presented to a user.

Based on the received gesture, the extraction component 110 extracts an object (e.g., literal text, image, video and/or visual representation) within an area selected (e.g., defined) by the received gesture. The extraction component 110 then provides the extracted object to an identification component 120.

For example, a user can gesture using a circular-type motion to indicate a particular portion of presented text, image(s) and/or visual representation for which the user desires contextually relevant information. While a circular-motion is discussed herein, those skilled in the art will recognize that any suitable gesture for which user selective intent can be ascertained can be utilized with the subject disclosure.

The identification component 120 is configured to identify additional information, if any, to package with the extracted object to assist a disambiguation component 130 and/or a search engine 140 to obtain contextually relevant information. The additional information can include any suitable information useful to intelligently determine what the user is viewing and what the user would like information regarding, for example, information about the viewing experience and/or the user. With respect to the viewing experience, the identification component 120 can provide information surrounding the object as presented (e.g., displayed), audio file(s), page data, metadata, page link(s) and the like. In one example, the additional information packaged with the extract object can be based on user-provided preferences. For example, a user can opt-in to provide information regarding language, machine, market, the user's physical location, the user's browsing history, web page(s) recently viewed and other non-personally identifiable information.

For example, a user can gesture to select an image of the Eiffel Tower located in Paris, France. Depending upon contextual information such as where the user is physically located, the system 100 can present result(s) associated with (1) France or Paris, for a user physically located in the U.S., or (2) the Eiffel Tower, for a user physically located in Paris.

The identification component 120 packages the extracted object and additional information, if any, and, in one exemplary embodiment, provides the package to the disambiguation component 130. In another exemplary embodiment, the identification component 120 provides the package directly to the search engine 140.

The disambiguation component 130 is configured to parse the packaged information to identify one or more dominant entities. In doing so, the disambiguation component 130 can filter out contextually insignificant information such as grammatical articles of speech, footer(s), etc. The disambiguation component 130 can thus disambiguate content of the packaged information to generate a search query to be provided to the search engine 140.

The search engine 140 can generate search result(s) based on the search query provided by the disambiguation component 130. The search engine 140 can provide the search result(s) to the presentation component 150. The presentation component 150 is configured to present the search result(s) to the user. In one exemplary embodiment, a plurality of results are received and presented based on a ranking order.

Figure 2:
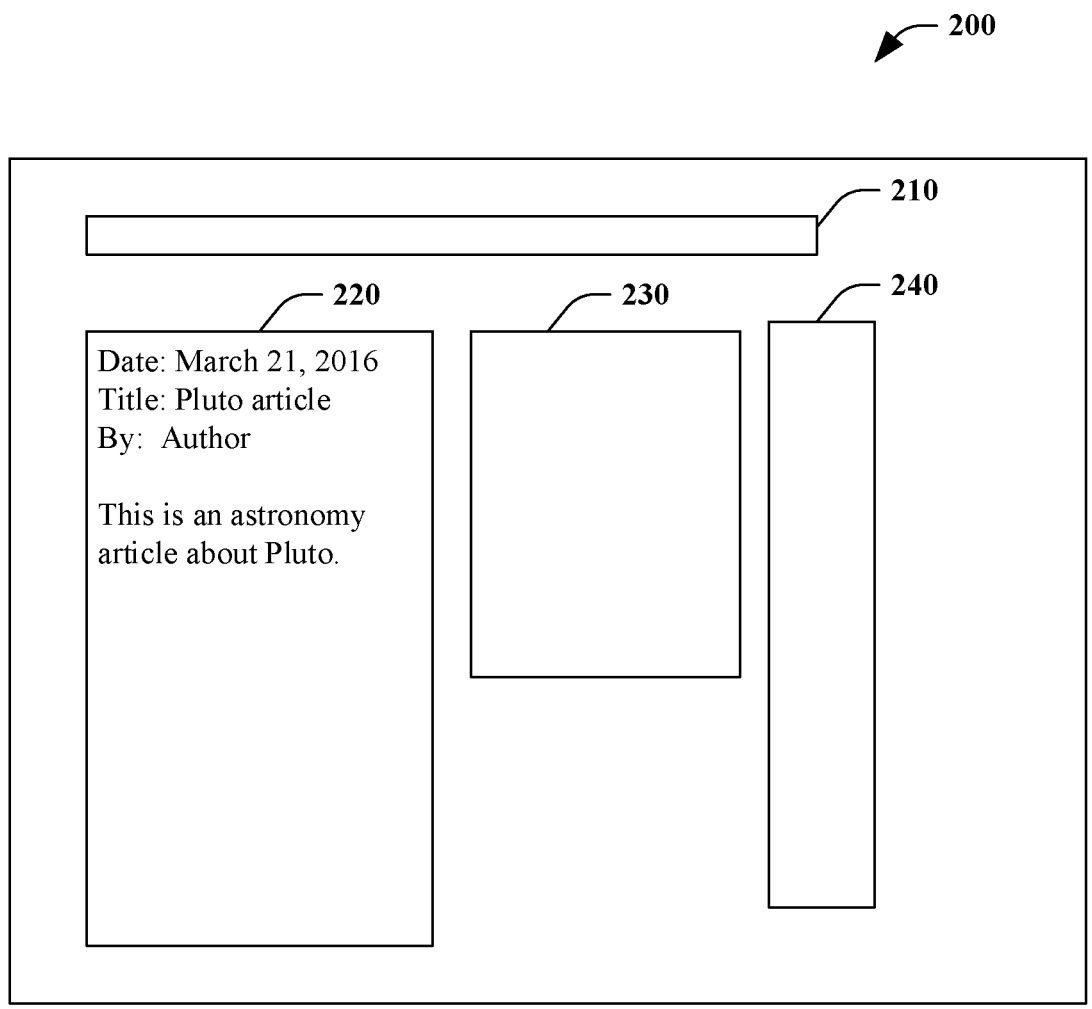
FIG. 2 illustrates is an exemplary user interface of an exemplary embodiment.
Figure 3:
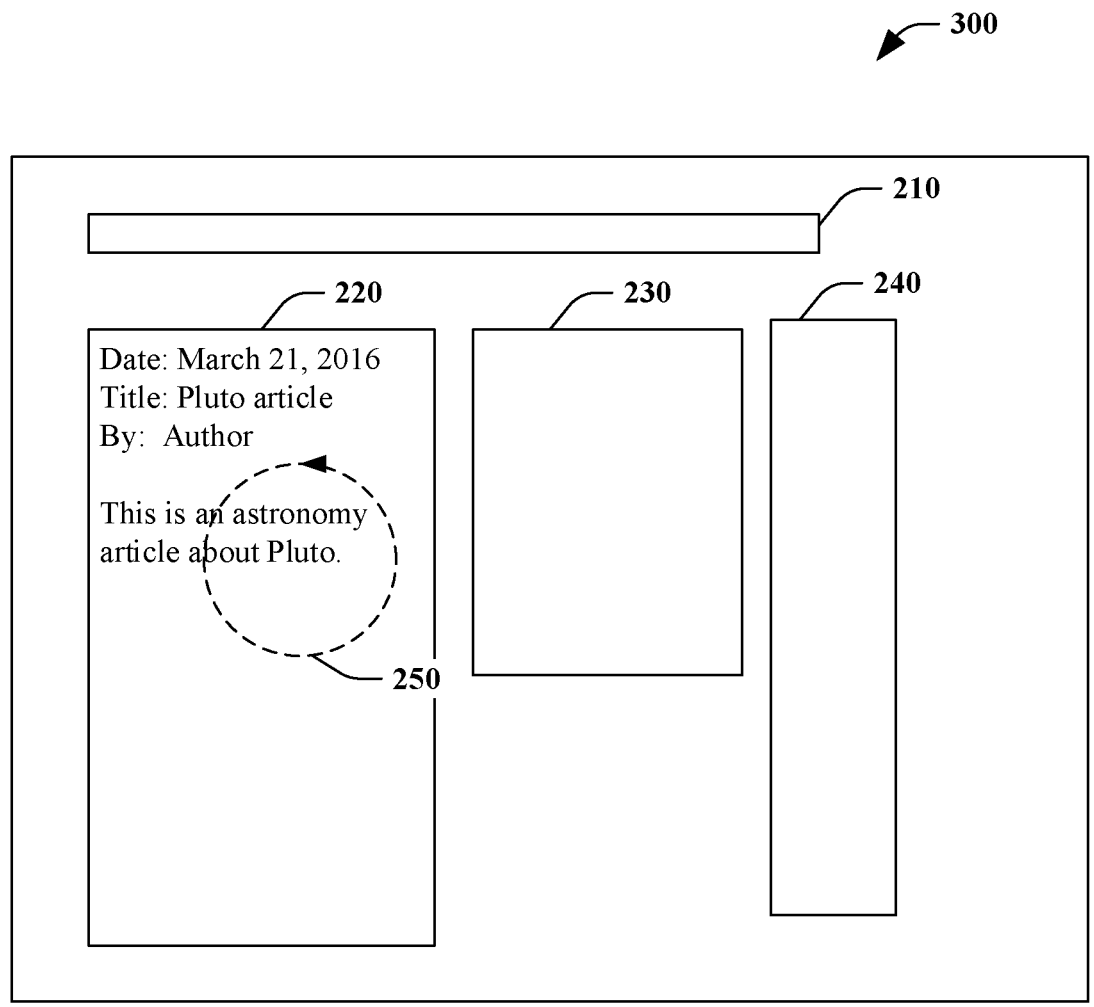
FIG. 3 illustrates is an exemplary user interface of an exemplary embodiment.

Turning to FIGS. 2 and 3, exemplary user interfaces 200 and 300 of an exemplary embodiment are illustrated. The user interfaces 200 and 300 include an address pane 210 which, for example, identifies a Uniform Resource Locator (URL) of a web page displayed in a first content pane 220. The user interfaces 200 and 300 further includes a second content pane 230 and an advertising pane 240. In one exemplary embodiment, content presented in the second content pane 230 is contextually relevant to content presented in the first content pane 220, for example, an image or video related to content presented in the first content pane 220.

In one example, information presented in the advertising pane 240 is contextually unrelated to the content presented in the first content pane 220. In another example, information presented in the advertising pane 240 is contextually related to the content presented in the second content pane 220. Content pane 220 includes identifying information including "Date", "Title" and "By" field along with text "This is an astronomy article about Pluto."

Referring to FIG. 3, using a gesture, a user has selected a portion of the text as indicated by a gesture area 250. Referring back to FIG. 1 with continued reference to FIG. 3, in response to the gesture, the system 100 can obtain contextually relevant information for presentation to the user. First, the extraction component 110 can identify and extract an object selected by the received gesture. In the example of FIG. 3, the object can be identified as at least a portion of the literal text "This is an astronomy article about Pluto" since the gesture area 250 includes a portion of the text. The extraction component 110 can provide the object to the identification component 120.

Next, the identification component 120 can package the object with additional information, for example, "Date", "Title" and/or "By" fields of the first content pane 220. Additionally, the identification component 120 can include the URL identified in the address pane 210 and information presented in the second content pane 230, if it is determined to be contextually related to the object. Further, information presented in the advertising pane 240 can be included in the package if it is determined to be contextually related to the object by the identification component 120. The identification component 120 can provide the packaged extracted object and additional information, if any, to the disambiguation component 130.

The disambiguation component 130 can parse the packaged information to identify one or more dominant entities. In doing so, the disambiguation component 130 can filter out contextually insignificant information such as grammatical articles of speech. The disambiguation component 130 can thus disambiguate content of the packaged information to generate a search query to be provided to the search engine 140.

The search engine 140 can generate search result(s) based on the search query provided by the disambiguation component 130. The search engine 140 can provide the search result(s) to the presentation component 150.

Figure 4:
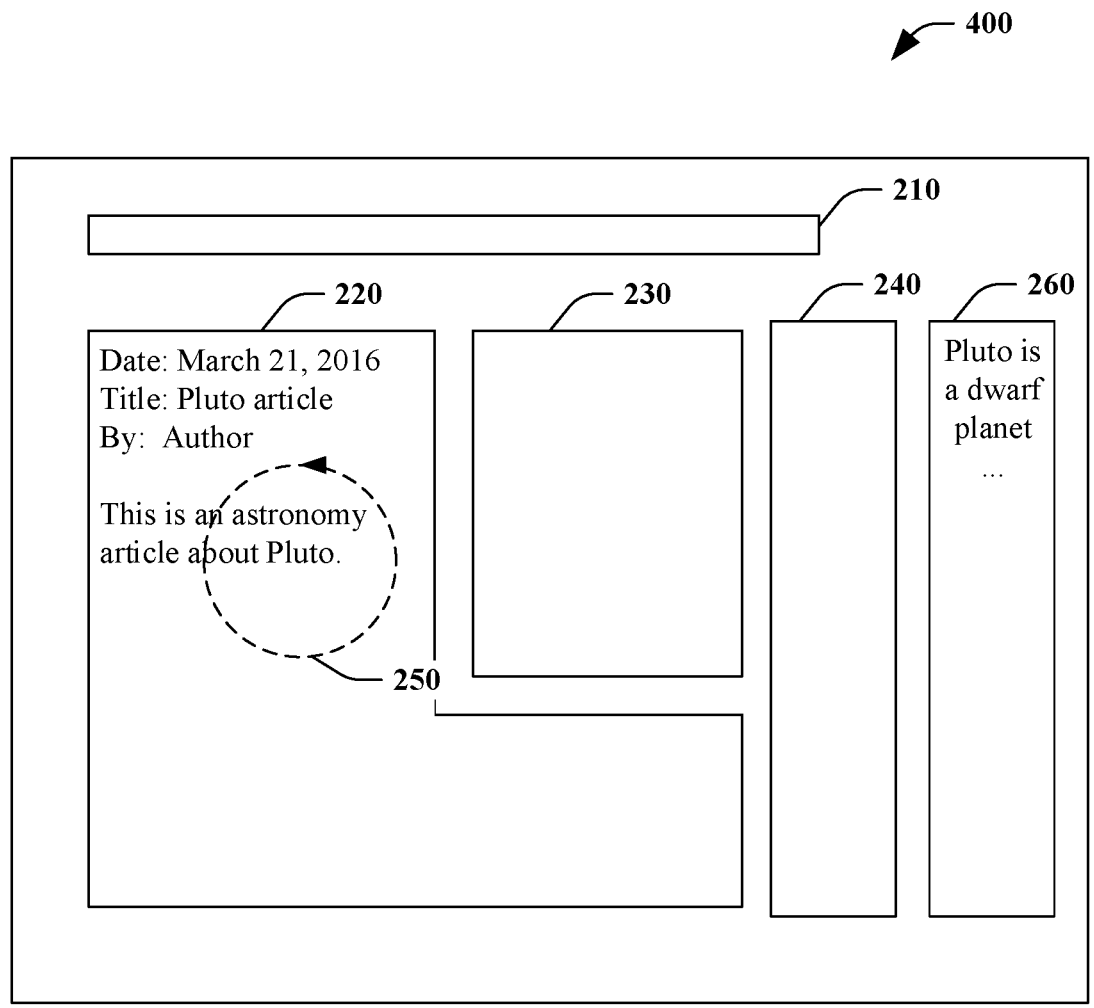
FIG. 4 illustrates is an exemplary user interface of an exemplary embodiment.

The presentation component 150 can present the search result(s) to the user. Turning to FIG. 4, an exemplary user interface 400 of an exemplary embodiment is illustrated. In the exemplary embodiment of FIG. 4, the presentation component 150 can present the search result(s) to the user in a result pane 260. In this example, the result pane 260 includes further information about Pluto: "Pluto is a dwarf planet . . . " received from the search engine 140.

Figure 5:
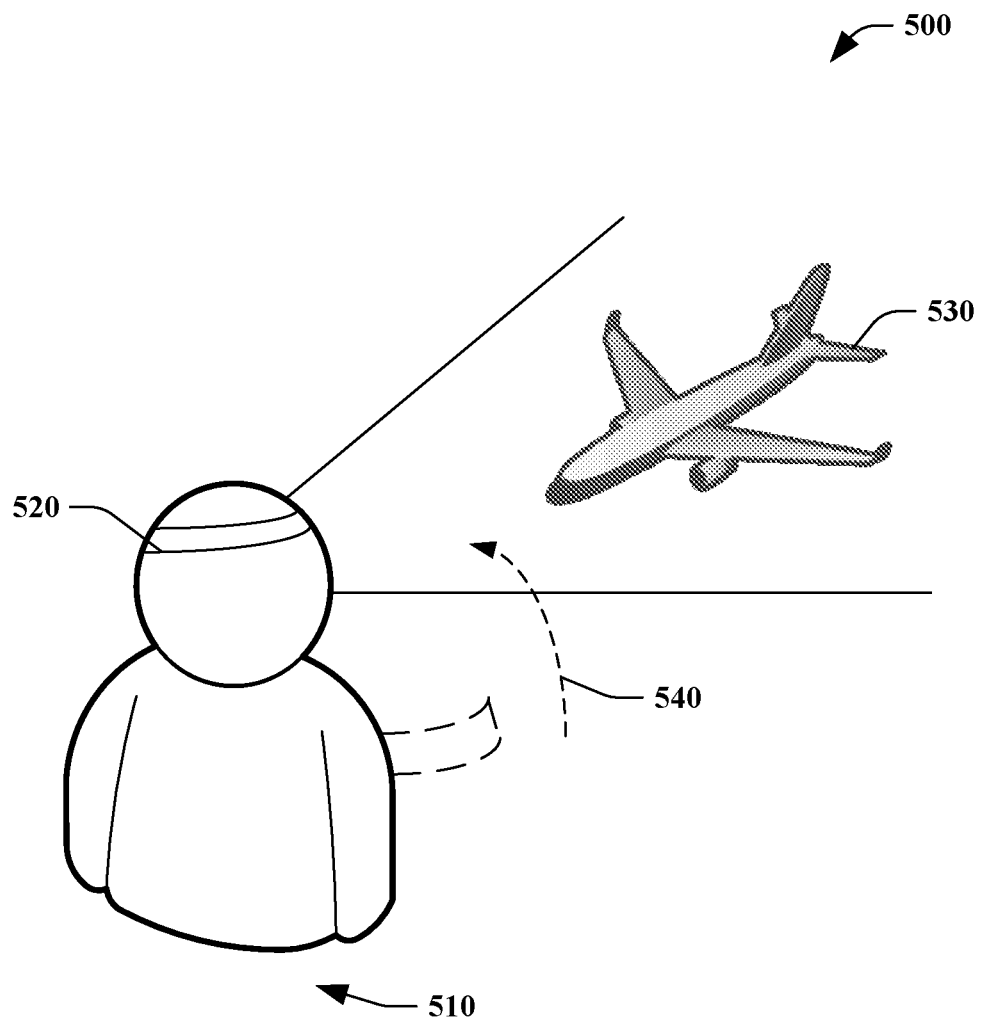
FIG. 5 is a diagram that illustrates a user using a virtual reality visualization/manipulation system.

Referring next to FIG. 5, a diagram 500 illustrates a user 510 using a virtual reality visualization/manipulation system 520 which projects an image 530. By gesturing as depicted by arc 540, the user can invoke the system for obtaining contextually relevant information 100 to obtain contextually relevant information with respect to the image 530.

Figure 6:
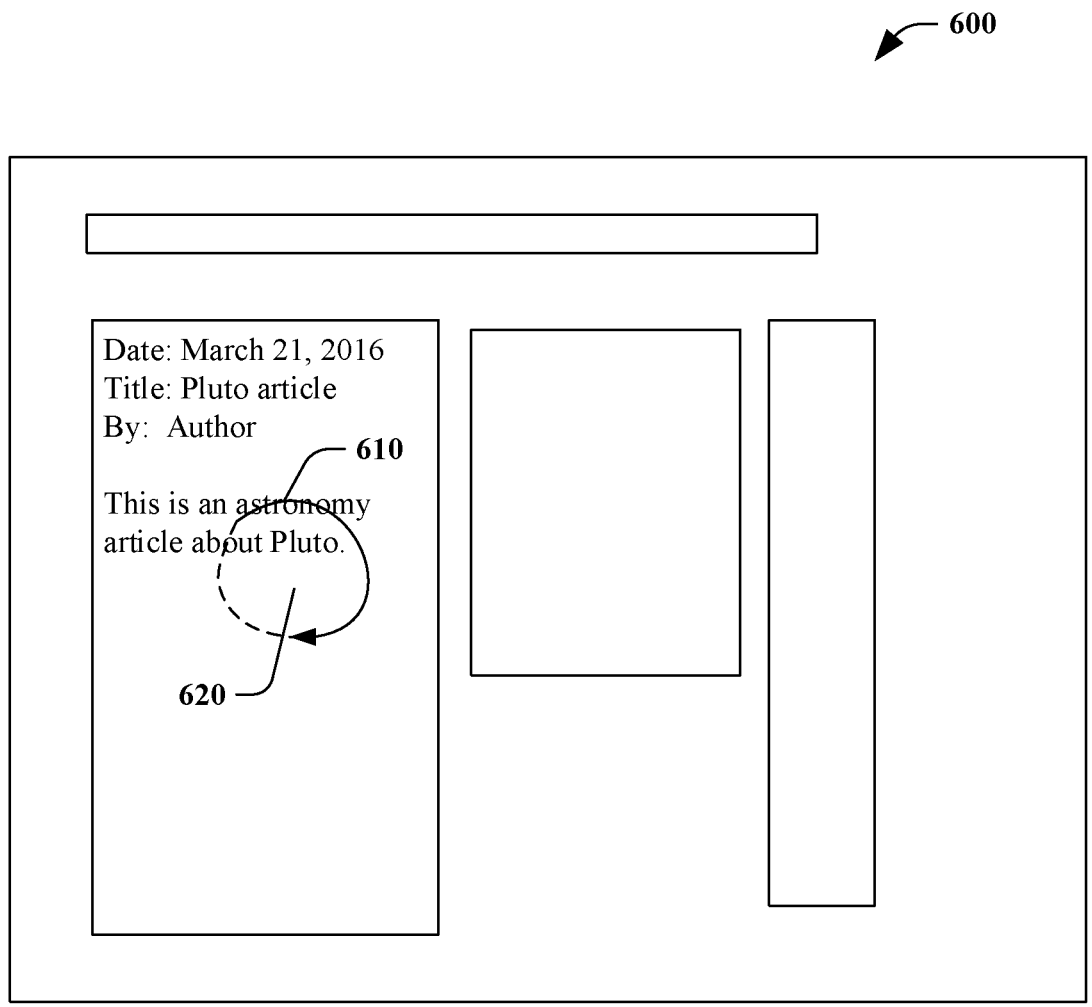
FIG. 6 illustrates is an exemplary user interface of an exemplary embodiment.

Turning to FIG. 6, an exemplary user interface 600 user interface 600 of an exemplary embodiment are illustrated. In the user interface 600, a user has selected a portion of the text as indicated by gesture fragment 610. However, the gesture fragment 610 does include a completed circular area. In one exemplary embodiment, the system 100 can use trace hint(s) to determine a gesture area 620 based on user selective intent.

Figure 7:
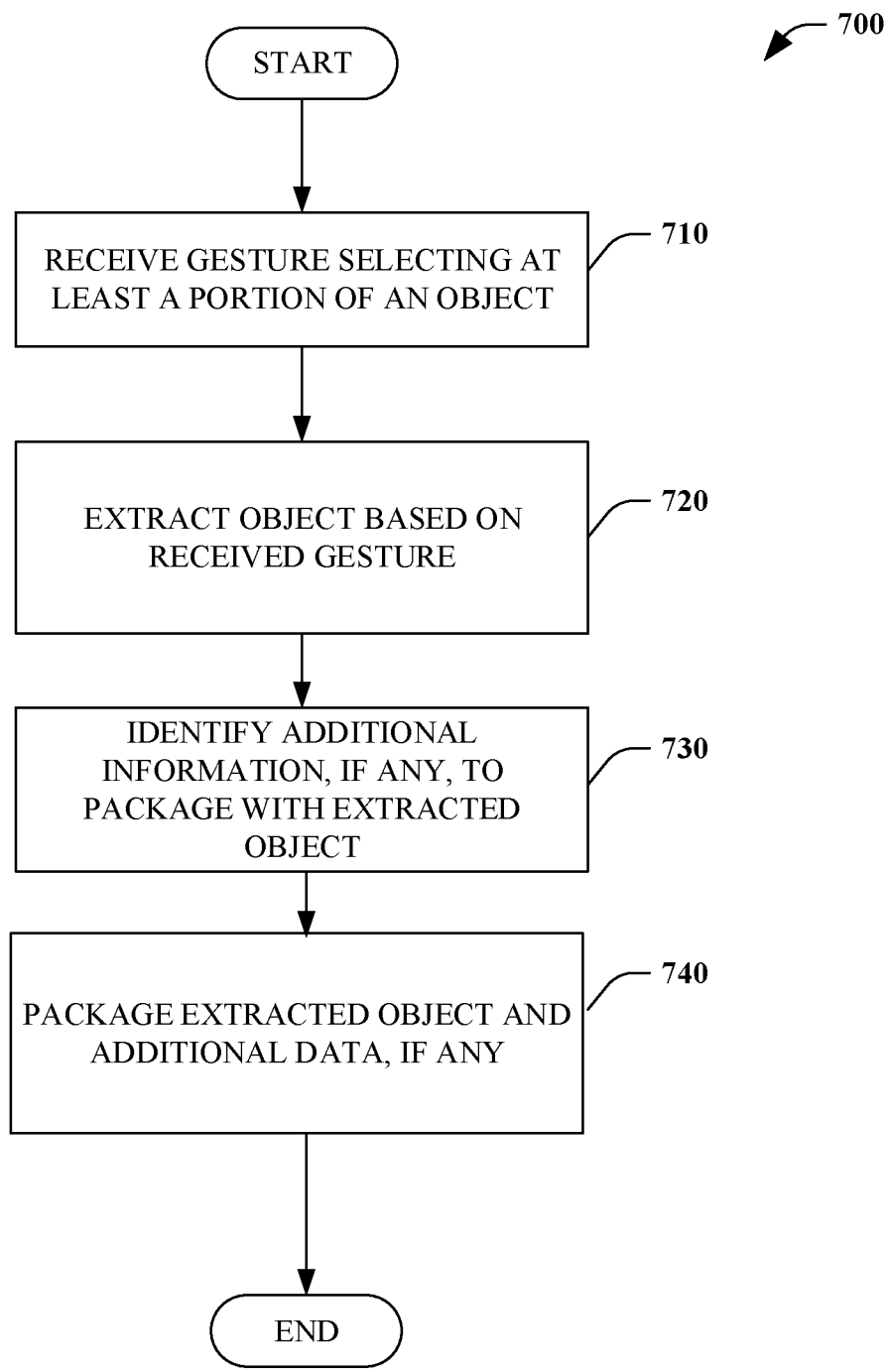
FIG. 7 is a flow diagram that illustrates an exemplary methodology of using a gesture to obtain contextually relevant information.
Figure 8:
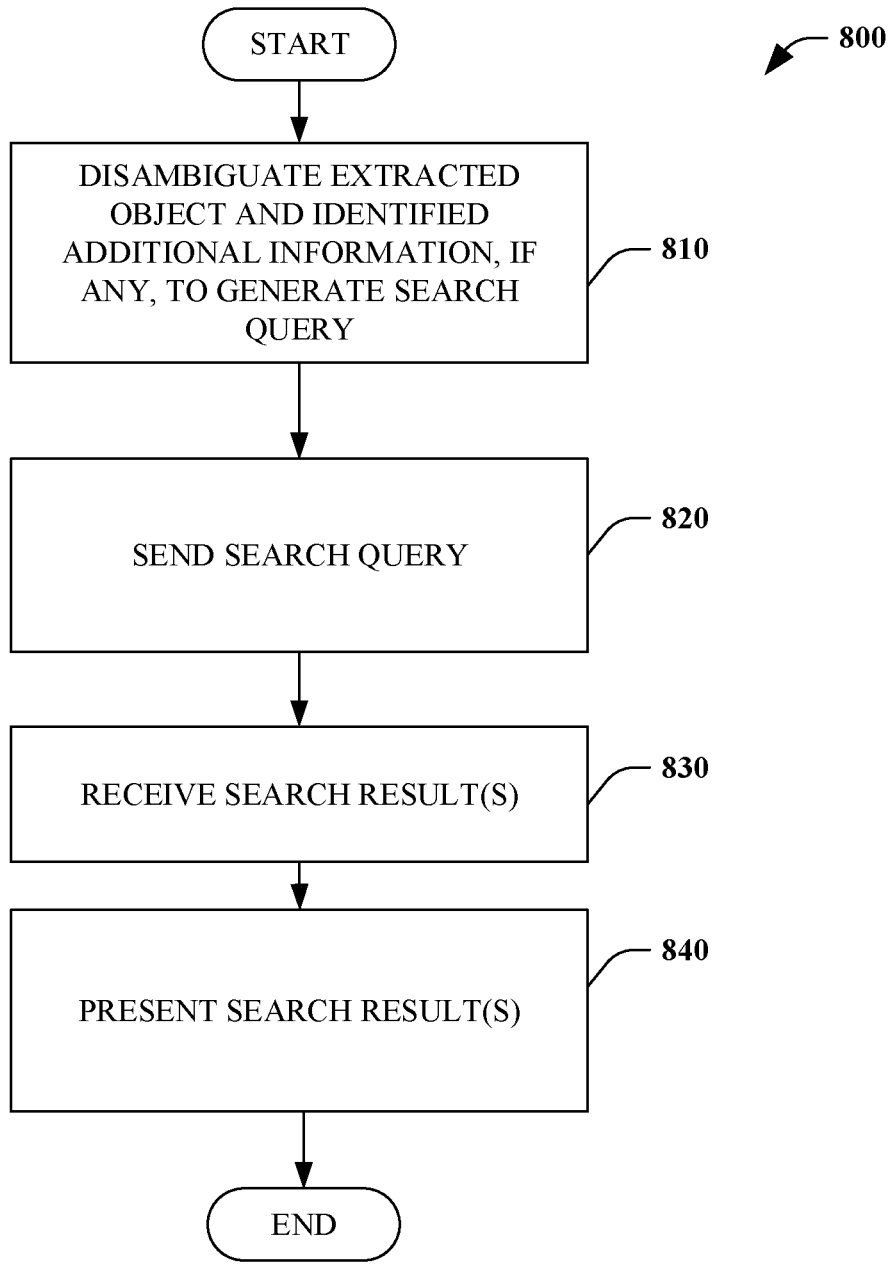
FIG. 8 is a flow diagram that illustrates an exemplary methodology of using a gesture to obtain contextually relevant information.

FIGS. 7 and 8 illustrate exemplary methodologies relating to using a gesture to obtain contextually relevant information. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 7, an exemplary methodology 700 of using a gesture to obtain contextually relevant information is illustrated. At 710, a gesture selecting at least a portion of an object is received, for example, from a touch and/or motion-sensitive system. At 720, based on the received gesture, the object is extracted. For example, the object (e.g., literal text, digitization of image and/or digitization of visual representation) can be extracted within an area selected by the received gesture.

At 730, additional information, if any, to package with the extracted object is identified. The additional information can include, for example, information about the viewing experience and/or the user. With respect to the viewing experience, information physically surrounding the object as presented (e.g., displayed), audio file(s), page data, metadata, page link(s) and the like can be identified. At 740, the extracted object and identified additional information, if any, is packaged.

Next, turning to FIG. 8, an exemplary methodology 800 of using a gesture to obtain contextually relevant information is illustrated. At 810, packaged extracted object and identified additional information, if any, is disambiguated, for example, by the disambiguation component 130. For example, the packaged information can be parsed to identify one or more dominant entities. In doing so, contextually insignificant information such as grammatical articles of speech can be filtered out. Content of the packaged information can thus be disambiguated to generate a search query to be provided, for example, to a search engine.

At 820, the search query is provided, for example, at the search engine 140. At 830, search result(s) are received, for example, from the search engine 140. At 840, the search result(s) are presented to a user. In one exemplary embodiment, the result(s) can be presented to the user via a same display displaying the extracted object, for example, in a result(s) pane 260. In another exemplary embodiment, the result(s) can be displayed to the user via a different display than displaying the extracted object, for example, a physically separate display such as a second computer display, a screen of a tablet, a screen of a smart phone and the like. In yet another exemplary embodiment, the result(s) can be presented via a canvas of a virtual reality visualization/manipulation system. In another example embodiment, the result(s) are presented to the user via a separate communication modality, for example, computer-generated text-to-speech (e.g., result(s) audibly presented to user).

Described herein is a system including a processor and a memory, the memory including an extraction component configured to receive a gesture selecting a portion of presented content and, based upon the received gesture, extract an object within a portion of the presented content selected by the received gesture. The memory can further include an identification component configured to identify additional information to package with the extracted object to assist in obtaining contextually relevant information. The system can include the memory further comprising a disambiguation component configured to parse the packaged extracted object and additional information, filter the packaged extracted object and additional information to identify a dominant entity, and provide the filtered packaged object and additional information to a search engine as a search query. The system can include the memory further comprising a presentation component configured to present a search result generated by a search engine in response to the packaged extracted object and additional information. The system can include wherein the search result is presented via a display. The system can include wherein the search result is presented via a virtual reality visualization/manipulation system. The system can include wherein the object comprises at least one of text, an image or a three-dimensional representation presented by a virtual reality visualization manipulation system. The system can include wherein the gesture is received from a touch sensitive display. The system can include wherein the gesture is received from a virtual reality visualization manipulation system. The system can include wherein the additional information comprises at least one of a user's physical location, information surrounding the object as presented, an audio file, a page data, metadata or a page link.

Described is a method of obtaining a contextually relevant result, the method executed by at least one computing device. The method can include receiving a gesture selecting at least a portion of an object being presented, extracting the object based on the received gesture, generating a package comprising the extracted object, disambiguating the package to generate a search query, providing the search query to a search engine, receiving a search result from the search engine; and presenting the search result. The method can further include identifying additional information to package with the extracted object, wherein the package further comprises the additional information. The method can further include wherein the additional information comprises at least one of a user's physical location, information surrounding the object being presented, an audio file, a page data, metadata or a page link. The method can further include wherein the gesture is received from a touch sensitive display. The method can further include wherein the gesture is received from a virtual reality visualization manipulation system. The method can further include wherein the object comprises at least one of text, an image or a three-dimensional representation presented by a virtual reality visualization manipulation system. The method can further include wherein the search result is presented by at least one of a display or a virtual reality visualization/manipulation system.

Described herein is a computer storage media storing computer-readable instructions that when executed cause a computing device to receive a gesture selecting at least a portion of an object being a presented, extract the object based on the received gesture, identify additional information to package with the extracted object, generate a package comprising the extracted object and the identified additional information, disambiguate the package to generate a search query, provide the search query to a search engine, receive a search result from the search engine; and present the search result. The gesture can be received from a virtual reality visualization manipulation system. The object can comprise at least one of text, an image or a three-dimensional representation presented by a virtual reality visualization manipulation system. The additional information can comprise at least one of a user's physical location, information surrounding the object being presented, an audio file, a page data, metadata or a page link.

Figure 9:
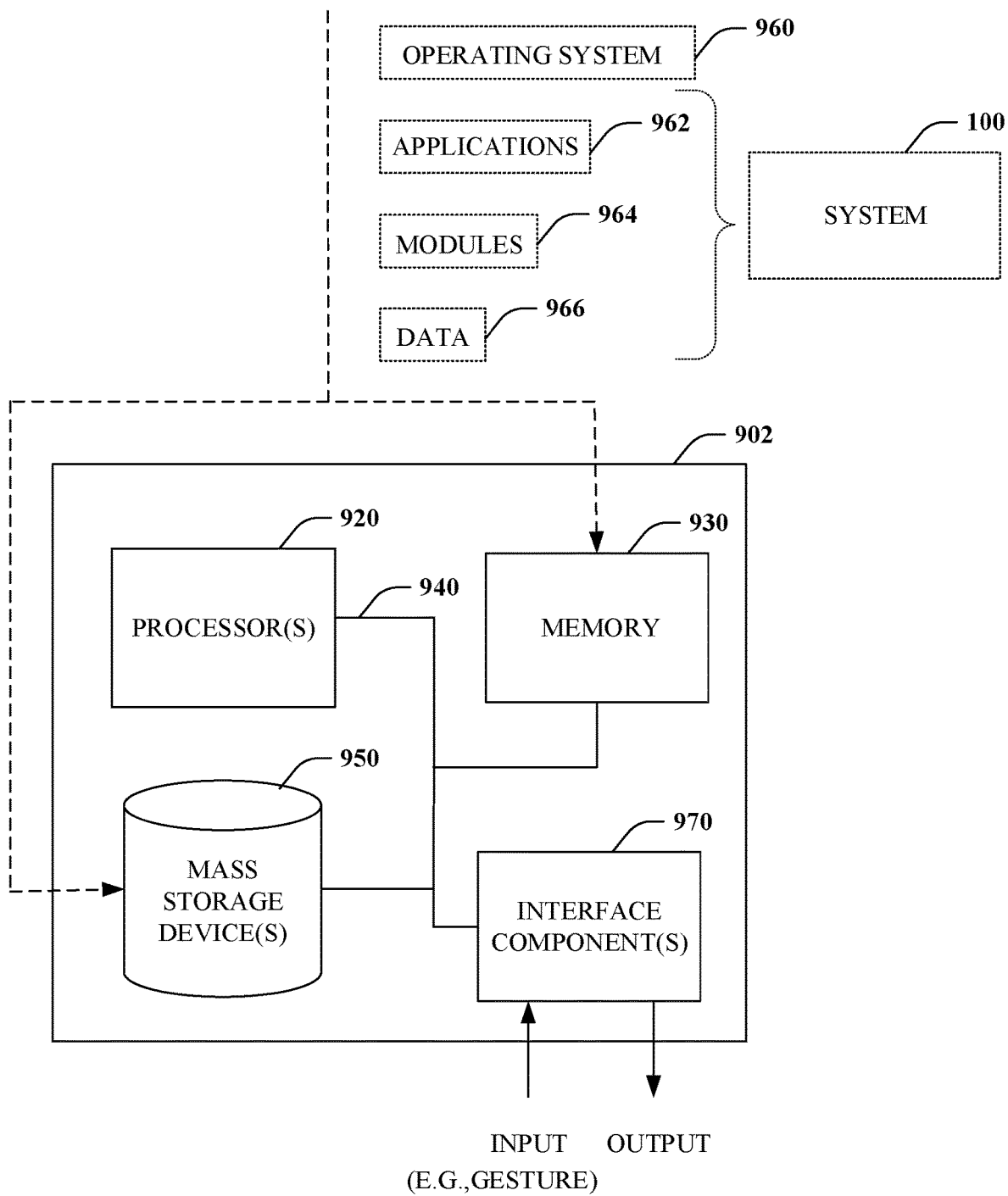
FIG. 9 is a functional block diagram that illustrates an exemplary computing system.

With reference to FIG. 9, illustrated is an example general-purpose computer or computing device 902 (e.g., desktop, laptop, tablet, watch, server, hand-held, programmable consumer or industrial electronics, set-top box, game system, compute node, etc.). For instance, the computing device 902 may be used in a system for using a gesture to obtain contextually relevant information.

The computer 902 includes one or more processor(s) 920, memory 930, system bus 940, mass storage device(s) 950, and one or more interface components 970. The system bus 940 communicatively couples at least the above system constituents. However, it is to be appreciated that in its simplest form the computer 902 can include one or more processors 920 coupled to memory 930 that execute various computer executable actions, instructions, and or components stored in memory 930. The instructions may be, for instance, instructions for implementing functionality described as being carried out by one or more components discussed above or instructions for implementing one or more of the methods described above.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 920 can be a graphics processor.

The computer 902 can include or otherwise interact with a variety of computer-readable media to facilitate control of the computer 902 to implement one or more aspects of the claimed subject matter. The computer-readable media can be any available media that can be accessed by the computer 902 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 902. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 930 and mass storage device(s) 950 are examples of computer-readable storage media. Depending on the exact configuration and type of computing device, memory 930 may be volatile (e.g., RAM), non-volatile (e.g., ROM, flash memory, etc.) or some combination of the two. By way of example, the basic input/output system (BIOS), including basic routines to transfer information between elements within the computer 902, such as during start-up, can be stored in nonvolatile memory, while volatile memory can act as external cache memory to facilitate processing by the processor(s) 920, among other things.

Mass storage device(s) 950 includes removable/non-removable, volatile/non-volatile computer storage media for storage of large amounts of data relative to the memory 930. For example, mass storage device(s) 950 includes, but is not limited to, one or more devices such as a magnetic or optical disk drive, floppy disk drive, flash memory, solid-state drive, or memory stick.

Memory 930 and mass storage device(s) 950 can include, or have stored therein, operating system 960, one or more applications 962, one or more program modules 964, and data 966. The operating system 960 acts to control and allocate resources of the computer 902. Applications 962 include one or both of system and application software and can exploit management of resources by the operating system 960 through program modules 964 and data 966 stored in memory 930 and/or mass storage device (s) 950 to perform one or more actions. Accordingly, applications 962 can turn a general-purpose computer 902 into a specialized machine in accordance with the logic provided thereby. In one example, application 962 includes key service component 160.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 962, and include one or more modules 964 and data 966 stored in memory and/or mass storage device (s) 950 whose functionality can be realized when executed by one or more processor(s) 920.

In accordance with one particular embodiment, the processor(s) 920 can correspond to a system on a chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 902 also includes one or more interface components 970 that are communicatively coupled to the system bus 940 and facilitate interaction with the computer 902. By way of example, the interface component 970 can be a port (e.g., serial, parallel, PCMCIA, USB, FireWire, etc.) or an interface card (e.g., sound, video, etc.) or the like. In one example implementation, the interface component 970 can be embodied as a user input/output interface to enable a user to enter commands and information into the computer 902, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 970 can be embodied as an output peripheral interface to supply output to displays (e.g., LCD, LED, plasma, etc.), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
    a computer comprising: a processor; and
    a memory having computer-executable instructions stored thereupon which, when executed by the processor, cause the computer to:
    use a gesture to obtain contextually relevant information with respect to an object within visually presented content document for a user of the computer using a virtual reality visualization and manipulation system, wherein the object comprising a text, image and/or video from the content document;
        receiving the gesture from the user selecting at least a portion of the visually presented content document;
        extracting the object based on the received gesture, wherein the object comprising a three-dimensional representation presented within the at least portion of the visually presented content document selected by the received gesture;
        identifying additional information to package with the extracted object to assist in obtaining contextually relevant information by parsing the package extracted object and additional information to identify one or more dominant entities to filter out contextually insignificant information, wherein the additional information comprises at least one of a user's physical location, information surrounding the object being presented, an audio file, a page data, metadata or a page link, and wherein insignificant information includes grammatical articles of speech and footer;
        generating a search query based upon the extracted object and the identified additional information;
        providing the generated search query to a search engine,
        receiving a search result from the search engine; and
        presenting the search result to the user via a display based on a ranking order.

2. The system of claim 1, wherein the object further comprises text.

3. The system of claim 1, wherein the gesture is received from a touch sensitive display.

4. The system of claim 1, wherein the gesture is received from a virtual reality visualization manipulation system.

5. A method of obtaining a contextually relevant result, the method executed by at least one computing device, the method comprising:
    using a gesture to obtain contextually relevant information with respect to an object within visually presented content document for a user of the at least one computing device using a virtual reality visualization and manipulation system, wherein the object comprising a text, image and/or video from the content document,
    receiving the gesture from the user selecting at least a portion of the visually presented content document;
    extracting the object based on the received gesture, the object comprising a three-dimensional representation presented within the at least portion of the visually presented content document selected by the received gesture;
    identifying additional information to package with the extracted object to assist in obtaining contextually relevant information by parsing the package extracted object and additional information to identify one or more dominant entities to filter out contextually insignificant information, wherein the additional information comprises at least one of a user's physical location, information surrounding the object being presented, an audio file, a page data, metadata or a page link, and wherein insignificant information includes grammatical articles of speech and footer;
    generating a search query based upon the extracted object and the identified additional information providing the search query to a search engine;
    receiving a search result from the search engine; and
    presenting the search result to the user via a display based on a ranking order.

6. The method of claim 5, wherein the gesture is received from a touch sensitive display.

7. The method of claim 5, wherein the gesture is received from a virtual reality visualization manipulation system.

8. The method of claim 5, wherein the object further comprises text.

9. A computer storage media storing computer-readable instructions that when executed cause a computing device to:
    use a gesture to obtain contextually relevant information with respect to an object within visually presented content for a user of the computing device using a virtual reality visualization and manipulation system, wherein the object comprising a text, image and/or video from the content document;
    receiving the gesture from the user selecting at least a portion of the object being a-visually presented;
    extracting the object based on the received gesture, the object comprising a three-dimensional representation presented within the at least portion of the visually presented content document selected by the received gesture;
    identifying additional information to package with the extracted object to assist in obtaining contextually relevant information by parsing the package extracted object and additional information to identify one or more dominant entities to filter out contextually insignificant information, wherein the additional information comprises at least one of a user's physical location, information surrounding the object being presented, an audio file, a page data, metadata or a page link, and wherein insignificant information includes grammatical articles of speech and footer;
    generating a search query based upon the extracted object and the identified additional information;
    providing the search query to a search engine;
    receiving a search result from the search engine; and
    presenting the search result to the user via a display based on a ranking order.

10. The computer storage media of claim 9, wherein the gesture is received from a virtual reality visualization manipulation system.

11. The computer storage media of claim 9, wherein the object further comprises text.

* * * * *